Sept. 7, 1954 E. B. ROBERTS 2,688,250
METER FOR DETERMINING THE DIRECTION
AND VELOCITY OF WATER CURRENTS
Filed March 9, 1954 2 Sheets-Sheet 1

INVENTOR.
Elliott B. Roberts
BY
Howard L. Rose
AGENT

Patented Sept. 7, 1954

2,688,250

UNITED STATES PATENT OFFICE 2,688,250

METER FOR DETERMINING THE DIRECTION AND VELOCITY OF WATER CURRENTS

Elliott B. Roberts, Westmoreland Hills, Md., assignor to the United States of America as represented by the Secretary of Commerce Application March 9, 1954, Serial No. 415,183

9 Claims. (Cl. 73—189)

The present invention relates to a meter and in particular to an instrument for producing electrical signals from which can be determined the speed and direction of flow of water currents. An instrument of this type is currently being used by the U. S. Coast and Geodetic Survey for obtaining information regarding current flow in coastal waters. The meter is suspended in the water from a buoy. The buoy is anchored at the desired location and receives signals from the meter over an electric cable. The buoy contains a battery-operated radio transmitter which transmits the information received from the meter to a receiving station where the necessary data reduction takes place. The meter aligns itself with the direction of current flow and an impeller carried by the meter rotates at a speed which is directly related to the speed of the current. The impeller drives a contacting mechanism in the interior of the meter to produce electrical signals from which the velocity of the current may be determined.

In the models currently in use the electrical signals are produced by a mechanical contacting mechanism. The signals from which the speed of the current may be determined are produced once each fifth revolution of the impeller shaft by mechanical contact. The direction of the current is determined by comparing the time relationship between the signals produced by a contact mounted on the body of the meter and the signals produced by contact which is carried on a compass mechanism. Since the meter aligns itself with the direction of current flow, the contact carried on the body thereof will give a fixed point of reference from which to determine the orientation of the meter. The contact on the compass indicates magnetic north and therefore from a comparison of these two signals the true direction of the current flow may be obtained. The difficulty with the present instrument lies in the delicacy of its adjustment and in the fact that it is difficult to overcome the effect of the mechanical contact on the alignment of the compass with magnetic north. To reduce this disturbing effect a rather heavy and elaborate spindle-mounted compass is used and an elaborate rotating type of contact must also be employed.

It is the primary object of the present invention to provide a radio current-meter which eliminates mechanical contacts.

Another object of the present invention is to provide a radio current-meter in which a simple pivoted compass may be employed.

Another object of the present invention is to provide a radio current-meter which employs a photoelectric system for producing the desired electrical signal.

In accordance with the preferred embodiment of the present invention a gear, which is mounted on a hollow shaft, is driven by an impeller which causes the gear to rotate at a speed proportional to the speed of the current to be measured. Mounted inside the hollow shaft is a small light bulb emitting an upward beam of light in the vertical axis of the system. This light beam is interrupted by a sloping mirror mounted on the gear, which reflects the light to create a horizontal beam rotating about the axis as the gear rotates. This beam encounters a second mirror formed in the interior surface of an inverted hollow truncated cone secured to the frame of the meter. The conical mirror reflects the light upward and toward a point upon the sensitive element of a photoelectric tube which is also in the said vertical axis. Interposed between the conical mirror and the photoelectric tube is a simple magnetic card compass mounted on a pivot also in the said vertical axis, so that the card interrupts the light beam at all points of its rotating path except at the north point of the card, when a slot in the card permits the light beam to pass through momentarily, to actuate the photoelectric cell and produce a signal. This signal pulse is indicative of magnetic north. A narrow element of the conical mirror is slotted to pass the light momentarily in its rotation through the cone to a mirror fixed in alignment with the directional axis of the whole instrument. The light which strikes the third mirror is also directed against the photoelectric surface; thereby producing a signal once each revolution of the card which indicates the orientation of the meter. By comparing the time relation of the light passing through the compass with the light reflected from the third mirror, the direction of current flow can be determined. Then by determining the number of pulses of light per second which impinge upon the photocell the speed of current flow can be determined.

Other uses and advantages of the invention will become apparent upon reference to the specification and drawings.

Figure 1:
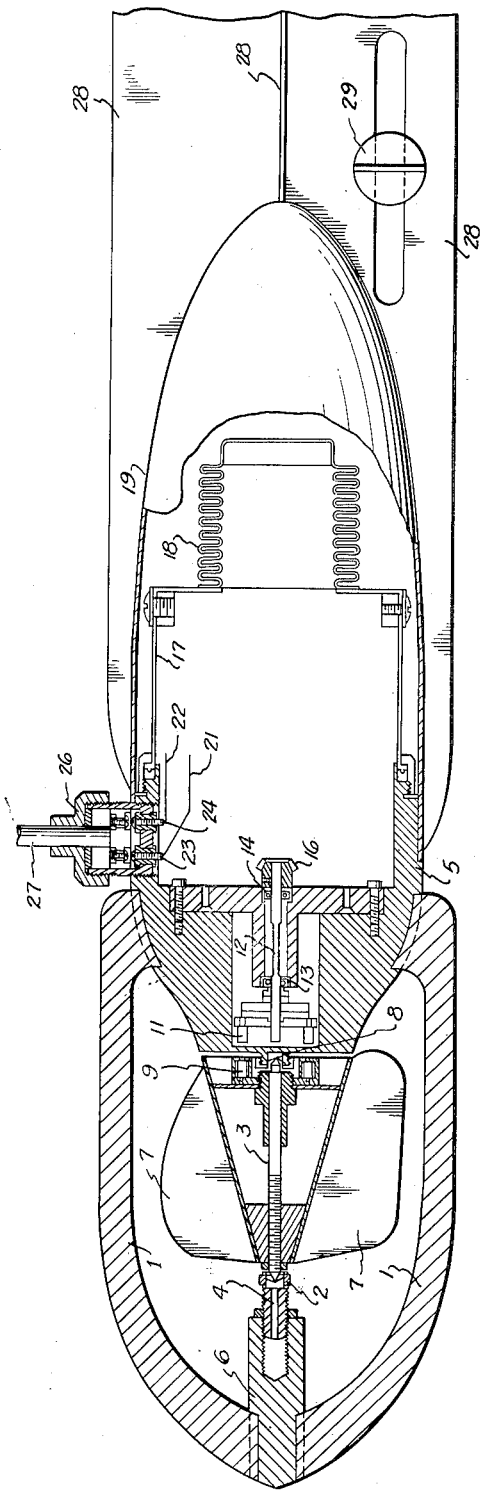
Figure 1 is a cross section of the instrument showing the mechanical construction thereof.
Figure 2:
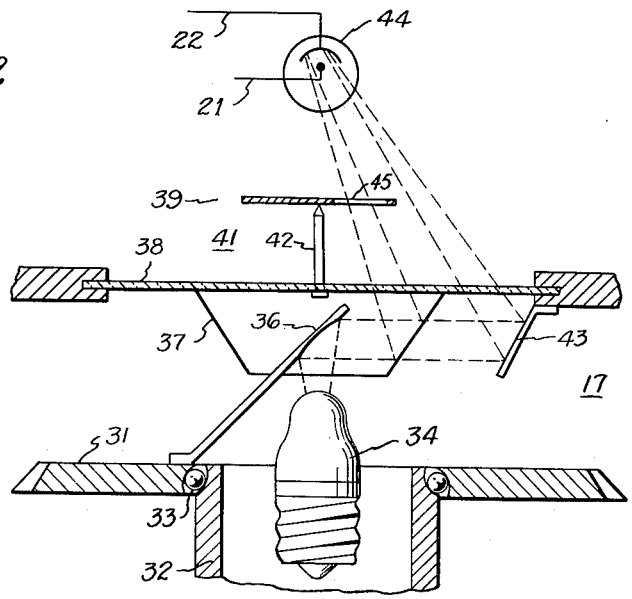
Figure 2 is a partial schematic diagram of the signal-producing mechanism which constitutes the preferred embodiment of the present invention.

The meter shown in Figure 1 is approximately streamlined, and has struts 1 at the front end of the instrument, only two of the four actually provided being shown in Figure 2. The struts are mounted on the main body 5 of the meter and are used primarily to carry the front bearing 2 for the impeller shaft 3. The bearing 2 is mounted in the bearing support 4 which is adjustably mounted in the arm 6. Mounted on the impeller shaft are four large helicoidal blades 7, (only two of which are shown) which provide great driving power relative to the light friction load of the meter mechanism. These blades provide clockwise rotation as seen from the front of the instrument. The other end of the impeller shaft is mounted in the bearing 8 which is supported in the main meter housing. Carried on the end of the shaft 3 very near to the front end of the meter housing 5 are the permanent magnets 9 which form an integral portion of a magnetic driving mechanism. The magnets 9 are fully sealed within a brass case mounted on the impeller shaft. Although only two magnets are shown, in practice six such magnets are mounted on the impeller shaft 3. Positioned directly opposite the magnets 9 are a corresponding number of magnets 11 which are mounted on the shaft 12 on the inside of the main meter housing. These units provide a nearly closed magnetic circuit, there being very little magnetic leakage which can affect the operation of the compass. The main body of the instrument is made of nonmagnetic material, this being essential to the proper operation of the compass within the meter, and therefore this magnetic drive system may be employed. Such a drive system permits the use of a completely sealed housing and eliminates the difficulties often encountered when a drive shaft passes through the housing.

Figure 3:
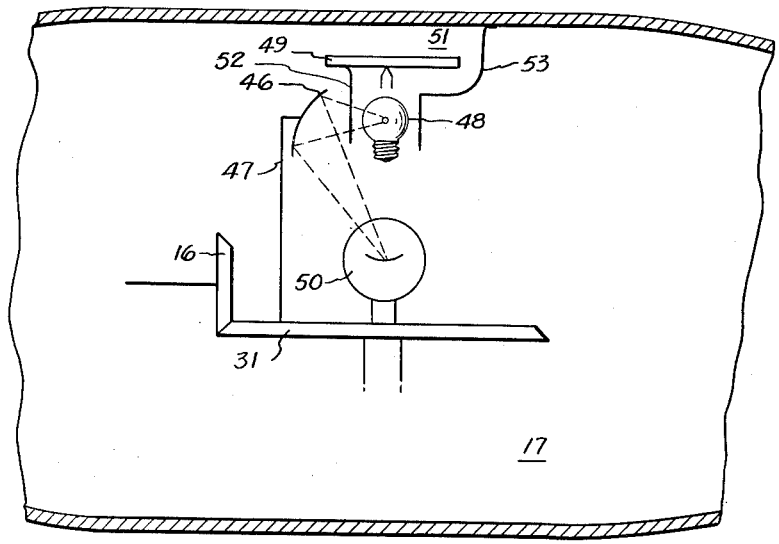
Figure 3 is a schematic diagram of another embodiment of the present invention.

The shaft 12 which carries the magnets 11 is mounted in the bearings 13 and 14, and carries on its rearward end the gear 16. The gear 16 is positioned in a sealed chamber 17, provided inside the meter, in which the signal producing mechanism of the present invention is mounted. The various mechanisms which may be mounted within the chamber 17 are shown in Figures 2 and 3. The interior of this chamber is filled with a transparent viscous material to provide damping of the compass, thereby eliminating the effects of stray disturbances in the water. The after end of this chamber is provided with a bellows 18 which allows for variations in volume within the chamber 17. The remainder of the meter inside the shell 19 is filled with water to weight the meter. The electrical signals produced within the instrument are connected over leads 21 and 22 to the terminals 23 and 24. These terminals make contact with the terminals within the connector 26 in which the end of the electrical cable 27 is mounted. This cable carries the signals produced by the meter mechanism to the radio transmitter in the buoy. Four tail fins 28 are provided for stabilizing the meter in the current. A ballast weight 29 is mounted in the lowermost fin 28. By adjusting this weight the meter can be made to remain in a horizontal position in the water.

Referring to Figure 2 there is shown the preferred means of the present invention for producing the desired electrical signals. The gear 31 is driven by the gear 16 shown in Figure 1. Gear 31 is rotatably mounted on the shaft 32 by means of the bearing 33. The bulb 34 which carries its own lens at the front of the bulb, is positioned within the hollow shaft 32. Mounted on the gear 31 is a mirror 36, the reflecting surface of which is positioned directly above the lens area of the bulb 34. The reflecting surface of the mirror is shaped so as to produce a horizontal beam of light which is directed against the mirrored surface 37. This mirror, which is formed on the inner surface of a hollow inverted truncated cone, is secured to the body of the meter by means of the transparent plate 38. The card 39 of the pivoted compass 41 is mounted for rotation on the pivot 42, which is fixed in the transparent plate 38. The sides of the mirror 37 have a slope such that the beam of light is directed against the bottom of the card 39. The card 39 has a slot 45 therein, preferably aligned with the magnetic north, which will pass light to the photocell 44 when the beam of light is aligned with the slot. At one point along its surface the mirror 37 is slotted so that the light striking that area will pass through the mirror 37 and strike the mirror 43 which is mounted on the main frame of the meter. The photoelectric cell 44 is positioned so as to intercept the light reflected by the mirror 43 and also the light which passes through the slotted card 39.

In operation the rotating mirror 36 directs the rotating beam of light against the mirror 37. Once during each revolution of the mirror 36, light will pass through the slotted portion of the mirror 37 and be reflected by the mirror 43 onto the photoelectric surface of the photocell 44. The mirror 43 is mounted on the frame of the instrument and preferably is aligned with the directional axis of the instrument. An electrical output will be produced from the photocell once each revolution of the gear 31 and will indicate a fixed position on the meter. The slot 45 in the card 39 indicates magnetic north, and therefore the beam of light which passes through this slot to produce an electrical signal gives a fixed point of reference with respect to magnetic north. A comparison of the electrical pulse produced by passage of light through the slot 45 with the pulse produced by the light reflected from the mirror 43 will allow the direction of the instrument to be determined. The number of pulses of light received per second from one or the other of the two reflecting surfaces will permit the determination of the speed of the current. It is apparent from the above that a signalling system can be provided in which mechanical contacts may be eliminated and therefore an expensive compass need not be used.

The preferred embodiment as shown in Figure 2 was of the type which produces a positive electrical pulse at desired intervals. The signalling mechanism shown in Figure 3 is of a type which produces a negative electrical pulse at the desired intervals. The mirror 46 is carried on a stem 47 which is mounted for rotation with the gear 31. A bulb 48 directs light against the mirror through its full 360 degrees of rotation, and the mirror 46 directs the light onto the photocell 50. The card 49 of the pivot compass 51 has extending from the bottom surface thereof a finger 52. During each revolution of the mirror 46, the finger 52 will intercept the light from the bulb 48 and therefore the output of the photocell 50 will be interrupted for a period depending on the width of the finger 52. A second finger 53 extends downward from the frame of the meter and also interrupts the light from the bulb 48.

Therefore the output of the photocell 50 will be interrupted once each revolution of the card 31 at a fixed point which indicates the position of the meter with respect to the magnetic north. This system also produces the two signals necessary for the correct interpretation of the velocity of the water current which is being measured.

It will be apparent that the embodiments shown are only exemplary and that various modifications can be made in construction and arrangement within the scope of my invention as defined in the appended claims.

What is claimed is:

1. A meter for determining the velocity of water currents, comprising means for producing a rotating beam of light which rotates at a speed proportional to the speed of the water current, photoelectric means positioned to intercept the beam of light, means bearing a fixed relationship to the orientation of said meter in the water for varying the intensity of the light beam at a predetermined point in the path of rotation of the light beam, a compass having a movable element for indicating direction, and means for varying the intensity of the light beam at a point in the path of rotation which bears a fixed relation to the direction of the movable element of said compass.

2. A meter for determining the velocity of water currents, comprising a source of light, means for forming the light into a beam, means for causing the beam to rotate at an angular velocity which bears a fixed relationship to the speed of the water current to be measured, photoelectric means positioned to intercept the beam of light and physical means for varying the intensity of the light reaching the photoelectric means, said physical means including means bearing a fixed relationship to the orientation of said meter in the water for varying the beam intensity at a predetermined point in the path of rotation of the light beam, a compass, and means for varying the beam intensity at a point in the path of rotation that bears a fixed relation to the direction indication of said compass.

3. A meter for determining the velocity of water currents, comprising a source of light, a photoelectric means, physical means for causing the light from said source to impinge upon said photoelectric means, said physical means including means for forming the light from said source into a beam, means including said last-mentioned means for causing the beam to rotate at an angular velocity which bears a known relationship to the speed of the water current to be measured, a first means which bears a fixed relationship to the body of the meter and varies the intensity of the light reaching said photoelectric means at a predetermined point in the path of rotation of the beam, a compass, and a second means which varies the beam intensity at a point in the path of rotation that bears a fixed relation to the direction indication of said compass.

4. The invention according to claim 3 in which said means for causing the beam to rotate comprises a shaft, impeller means positioned in the water current to be measured for causing said shaft to rotate at a speed bearing a known relationship to the speed of the current, a mirror, and means for causing said mirror to rotate about a periphery at a speed proportional to the speed of rotation of said shaft.

5. The invention according to claim 4 in which said first means comprises an opaque member extending from the body of the meter and said second means comprises an opaque member extending from the movable element of said compass.

6. A meter for determining the velocity of water currents comprising means for producing a beam of light which rotates at a speed having a known relationship to the speed of the water current to be measured, photoelectric means, a first mirror for directing the beam at said photoelectric means during the complete rotation of the beam, compass means interposed between the beam and said photoelectric means, said compass means having means for passing the beam to the photoelectric means at a point during the rotation of the beam determined by the directional indication of said compass means, said mirror having a slotted portion for passing the beam undeflected at a fixed point in the rotational path of said beam and a second mirror for directing the undeflected beams to said photoelectric means.

7. The invention according to claim 6 in which said compass means is a pivoted card compass having a transparent portion lying along a radius of said card compass.

8. The invention according to claim 7 in which the first-mentioned means comprises a shaft, impeller means for causing the shaft to rotate at an angular velocity having a known relationship to the speed of the water current, a third mirror, and means for causing said third mirror to rotate at a speed proportional to the speed of said shaft.

9. The invention according to claim 8 in which said first-mentioned means further comprises a source of light, said third mirror forming the light into a horizontally rotating beam.

References Cited in the file of this patent

UNITED STATES PATENTS

| Number | Name | Date |
| --- | --- | --- |
| 1,865,373 | Idrac | June 28, 1932 |
| 1,957,681 | Thompson | May 8, 1934 |
| 2,321,971 | Becker | June 15, 1943 |

FOREIGN PATENTS

| Number | Country | Date |
| --- | --- | --- |
| 558,187 | Great Britain | Dec. 24, 1943 |